United States Patent [19]
Volland

[11] Patent Number: 5,132,090
[45] Date of Patent: Jul. 21, 1992

[54] SUBMERGED ROTATING HEAT EXCHANGER-REACTOR

[76] Inventor: Craig S. Volland, 5615 Kenwood, Kansas City, Mo. 64110

[21] Appl. No.: 521,830

[22] Filed: May 8, 1990

Related U.S. Application Data

[60] Continuation-in-part of Ser. No. 91,600, Aug. 31, 1987, abandoned, which is a division of Ser. No. 866,876, May 23, 1986, Pat. No. 4,693,304, which is a continuation-in-part of Ser. No. 766,648, May 19, 1985, Pat. No. 4,613,409.

[51] Int. Cl.⁵ .................... B01D 47/16; F28D 11/04
[52] U.S. Cl. .................... 422/201; 261/87; 422/209; 435/312
[58] Field of Search ............ 422/201, 209; 435/303, 435/306, 312; 261/154, 155, 156, 83, 87, 152; 165/88, 89

[56] References Cited

U.S. PATENT DOCUMENTS

| | | | |
|---|---|---|---|
| 1,047,969 | 12/1912 | Mertens | 165/89 X |
| 3,732,149 | 5/1973 | Santero | 435/312 X |
| 4,310,630 | 1/1982 | Girard et al. | 435/312 X |
| 4,353,874 | 10/1982 | Keller et al. | 422/209 X |

FOREIGN PATENT DOCUMENTS

59-69136 4/1984 Japan .................. 422/209

*Primary Examiner*—Jill A. Johnston
*Attorney, Agent, or Firm*—Dressler, Goldsmith, Shore, Sutker & Milnamow, Ltd.

[57] ABSTRACT

An apparatus transfers heat for the purpose of purifying raw feed liquid, separating dissolved gases from liquids, vaporizing heat transfer fluids or containing and regulating biological/chemical reactions. The feed liquid is directed into an evaporator module submerged in a solar pond or other body of heated liquid. The evaporator module includes a rotating housing through which a plurality of spaced apart substantially horizontal open ended heat transfer tubes extend. A heating liquid is directed through the heat transfer tubes. The feedwater is distributed within the evaporator module so as to cause the feedwater to descend into heat transferring contact with the heat transfer tubes and thereby vaporize a portion of the feedwater. A preferred embodiment of the evaporator module is disclosed which includes cavitation fins for urging the heated liquid through the evaporator module.

14 Claims, 4 Drawing Sheets

FIG_9

FIG_10

SUBMERGED ROTATING HEAT EXCHANGER-REACTOR

This application is a Continuation-in-Part of application Ser. No. 091,600, filed on Aug. 31, 1987, and now abandoned, which is a Division of Ser. No. 866,876, filed on May 23, 1986, now U.S. Pat. No. 4,693,304, which is a Continuation-in-Part of application Ser. No. 766,648, filed Aug. 19, 1985.

BACKGROUND OF THE INVENTION

1. Field of the Invention

The present invention relates to the use of a specialized horizontal tube heat exchanger operating as either a high rate falling film evaporator, a biological/chemical reactor or a gas-liquid contactor while submerged within a body of heated liquid. Principle applications for the device are (1) a solar still submerged within a salt gradient solar pond; (2) a waste heat evaporator submerged within a hot industrial effluent; (3) a biological/chemical reactor submerged within a temperature controlled liquid heating or cooling medium; and (4) a heat assisted gas stripper. Operating as a solar still, the invention may be used to purify seawater, brackish water, freshwater containing unusually high fouling impurities and for the recycling of irrigation water. Operating as a waste heat evaporator, the apparatus uses hot wastewater as an energy source to purify raw feedwater and to generate heat or vapor for industrial space heating or process uses. As a reactor the present invention has specialized application for reactions requiring careful temperature control, heat recovery, gentle mixing, and prompt removal of gaseous reaction products. As a gas liquid contactor the present invention may be used to separate or strip dissolved gases and volatile organic contaminants from water and other liquids. When used in combination with low boiling point heat transfer fluid and a Rankine cycle turbine generator system, the apparatus may be used to produce electrical power.

2. Description of the Prior Art

The horizontal tube falling film evaporator has been in commercial desalination service since the late 1960s, in the single effect vapor compression mode, and more recently, in the multiple effect configuration using generated steam as an energy source. This evaporator design has also been used in connection with solar ponds and waste heat with the intent to produce power. In order to improve the working quality of the available heat these systems have sometimes utilized low boiling point heat transfer fluids in combination with Rankine cycle turbine generators.

However, in each such case the evaporator consisted of a conventional shell and tube arrangement situated external to the heat laden liquid body. In the recent past, solar ponds have been used to heat water flowing through submerged tubing for space heating purposes without severe corrosion problems.

A rotating disk distillation device is described in U.S. Pat. No. 3,764,483 which operates on the principle of a hydrodynamically applied thin film relying on the wiping action of a flexible blade. A multiple effect version of this device has been proposed for use with a salt gradient solar pond. However, the device was proposed to be situated external to the pond and is not suitable for submerged operation, nor is the evaporation principle the same as the present invention, i.e., wiped film disk versus horizontal tube falling film.

Accordingly, there appears to be no disclosure in the prior art of an evaporator submerged within the heat source, with exposed tube sheets, so as to reduce construction costs, reduce ambient heat loss, eliminate pumping of heating medium, and that rotates to (1) maximize the falling film heat transfer effect, (2) repeatedly expose the concentrate to heat transfer surface, (3) periodically submerge a large proportion of the heat transfer tubes to reduce scaling and (4) induce flow-through of the heating medium. This combination of features cooperate to maximize the efficiency of the evaporation process while minimizing space requirements compared to the prior art.

The art of producing drinking water from salt water by means of solar distillation is well known. Most designs of solar stills consist of floating or semi-submerged apparatus enclosed by material transparent to solar radiation wherein a pool of salinous water is allowed to heat up and vaporize.

Condensation of the vapor is frequently accomplished by routing the vapor through a deeper level of seawater. Attempts have been made to improve the efficiency of solar energy collection by using lens and solar tracking devices. Examples of prior art are disclosed in U.S. Pat. Nos. 4,325,788, 4,276,122, 4,219,387, 4,172,767, 3,986,936, 3,703,443, 3,408,260, 3,357,898 and 4,151,046.

Systems have heretofore been constructed wherein flat plate solar collectors feed hot water to conventional multistage flash distillation plants. A demonstration scale system of such a system has been in operation in Mexico for several years. Another approach has been to use photovoltaic cells to generate electricity that operates a membrane separation desalination process.

Most of the prior art dealing with solar energy collection ponds, consists of articles published in various trade and scientific journals and, in particular, recent research conducted and published on salt gradient solar ponds by the United States Departments of Interior, Energy and Agriculture. In U.S. Pat. No. 4,110,172 an enclosed solar collection pond is disclosed containing salinous water with a depth of one to ten inches. This invention is focused on the rapid heating of the shallow pool of water and the recirculation of the heated air in order to raise the efficiency of the process.

A ditch similar in configuration to the solar pond utilized in the present invention is described in U.S. Pat. No. 4,141,798. However, the solar still arrangement as described therein is substantially similar in principle to the above mentioned prior art which uses a flexible transparent plastic enclosure operating on a relatively shallow pool of salinous water, i.e., the greenhouse effect.

Applicant is not aware of any prior art which uses a salt gradient solar pond, with its superior temperature elevation capability and heat storage capability in the absence of insolation and/or in the cold season, in combination with a submerged evaporator device specially designed to take advantage of this stored heat in a space much smaller than required by shallow, non-salt gradient ponds, and constructed in such a way as to minimize the consequences of the corrosive environment.

In general, biological or chemical reactions can take place within any form of open or enclosed container. The prior art is replete with reactor configurations where the primary objective is to exercise control of the reaction to most efficiently produce the desired end product. In the biological category, reactors are generally classified as aerobic or anaerobic and suspended growth or fixed film. Most of these reactors are designed for stationary batch or continuous operation wherein nutrient laden liquids flow in and the products of reaction flow out. Solid residues are removed as necessary to maintain optimum efficiency of the process. Temperature control of a biological or chemical reaction may be accomplished by preheating or cooling the influent, by internal electrical heating elements, by heat transfer tubing within the reactor for heating or cooling, or perhaps most frequently by heating or cooling jackets on the periphery of the reactor vessel so as to avoid interference with the requirement for mixing or agitation. The aeration and/or mixing function may be accomplished by external agitation of the reactor vessel, conventional submerged blade mixers, submerged air lifts or diffused bubble aeration. Thus reactions have traditionally been maintained with respect to temperature and mixing by various combinations of the aforementioned techniques within stationary vessels.

In the late 1950s fixed film rotating biological contactors were introduced in Europe and later in the United States. This type of reactor is partially submerged within the nutrient laden liquid body and its rotation is designed to allow attached organisms periodic access to both oxygen in the air and nutrients in the liquid. This apparatus consists of open media attached to the rotating support shaft and has no role in temperature regulation of the process. The rotating biological contactor has also been operated in the anaerobic mode by its complete submergence in the nutrient laden liquid body which in turn is contained in a stationary enclosed vessel. Heat is added to the process by any of the aforementioned conventional techniques.

Applicant is not aware of any prior art which uses a reactor consisting of a horizontal tube heat exchanger, submerged within a liquid heating or cooling medium, with exposed tube sheets that rotates to (1) induce flow through of the heating or cooling medium for temperature regulation, (2) periodically expose the reactor liquor to the heat transfer tubing thereby imparting a gentle mixing effect, and (3) create a thin film of liquor on the tubing from which gaseous products of the reaction may more easily separate. The entire reactor vessel embodiment of the present invention thus rotates within the heating or cooling medium, and contains the reaction liquor, rather than being submerged within it, as is the case with the aforementioned rotating biological reactor.

The present invention may be utilized as a gas-liquid contactor by introducing a gas into the heat exchanger module. Gas-liquid contacting is a mass transfer process whereby dissolved gases and volatile organic contaminants (VOC's) are separated from liquid substrates. Heretofore this process has been optimized by maximizing the concentration gradient across the gas liquid interface and by presenting a contacting surface characterized by a thin liquid film and the maximum practical surface area density. The most common device currently in use is the packed bed air stripping tower in which contaminated liquid is introduced at the top and where counter current flow of clean air is introduced at the bottom. The air is removed at the top of the tower and usually sent for destruction of entrained contaminants in an incinerator or catalytic oxidation unit or for capture of contaminants in a gas phase activated carbon filter.

A number of rotating gas-liquid contactors are described in the prior art. The common principle of these devices is to produce extremely thin films, low pressure loss and high volumetric mass transfer coefficients by contacting liquids and vapors in a centrifugal field. In recent years surface area density has been increased by adding packed media to the rotating element. These devices are designed to operate at up to 2000 revolutions per minute.

The present invention represents an improvement over the aforementioned gas-liquid contactors because of its ability to add heat directly to the gas-liquid interface. Increasing the temperature significantly improves the efficiency of the gas separation or volatile contaminant removal process. In the latter case, for example, the efficiency of contaminant removal depends on (1) the air/water ratio applied to the system, (2) Henry's Law constant of the contaminant and (3) the rate of mass transfer. The rate of mass transfer, in turn depends on the contaminant's water diffusion coefficient and the interface area. Increasing temperature positively affects two of these key process variables. Henry's Law constant increases by a factor of two to three for each 10 degrees C rise in temperature, and the water diffusion coefficient of a substance is directly proportional to the absolute temperature K.

The rotation of the present invention is not intended to create a significant centrifugal field as in the case of other rotating gas-liquid contactors. Its rotation generally between 40 and 120 RPM is intended to simultaneously achieve pumping of the heating medium and assured wetting of the contact surfaces which are the horizontal tubes within the heat exchanger. The applicant is not aware of any prior art where heat is introduced directly to the rotating, horizontal tube, gas-liquid contacting surface as in the present invention.

SUMMARY OF THE INVENTION

The present invention may be submerged with a favorable effect within various bodies of liquid that contain quantities of heat that are generally considered in the current industrial practice as of less suitable quality for many desired purposes.

A first preferred embodiment of the present invention combines the unique heat collection and storage capability of the salt gradient solar pond and the superior efficiency of the falling film evaporator in such a way as to minimize construction cost, land requirements, and heat loss to the atmosphere. This embodiment is hereinafter referred to as a high rate solar still.

Compared to other solar energy collection devices, the salt gradient solar pond has the unique capability of maintaining a useful quality and quantity of heat over a sufficient period of time to compensate for diurnal, week long, and even seasonal reductions in insolation. The typical depth of 6 to 10 feet also allows for the collection and storage of solar energy in a smaller space than is the case for other types of solar ponds. Salt gradient solar ponds, in actual practice, have been shown to generate a temperature up to 180 F. during the summer months.

The distillation process (evaporation) has the unique characteristic that the cost of construction and operation, as well as the product water quality, vary insignificantly with the degree of contamination of the feedwater. Hence, the lower the quality of the feedwater, the more economical is the distillation process as compared to other processes capable of removing dissolved inorganics, such as reverse osmosis membranes. Heretofore, the principle drawback to distillation has been the cost of energy to operate the process. The use of solar energy or waste heat, as prescribed herein, avoids this problem.

The high rate solar still of the present invention comprises an evaporator apparatus submerged within a salt gradient solar pond. The pond is preferably long and narrow in configuration in order to reduce the unsupported span and the construction cost of the evaporator support bridge and to allow the use of a factory fabricated impermeable pond liner. This configuration also reduces the risk of wind disturbance since the prevailing wind is usually on the north-south axis and perpendicular to the east-west orientation of the solar pond that maximizes insolation. The depth of the pond is dependent upon the maximum heat storage capability of the pond and the need to provide space for the proper operation of the evaporator. Depending on local conditions, the pond may lie partially below grade or it may be constructed entirely above grade within earthen dikes, or fabricated walls, to facilitate access to piping. In general, the sides of the pond will be sloped at such an angle that entirely earthen construction may be possible without producing shadows during periods of significant insolation.

The evaporator apparatus is submerged within the heat storage section of the salt gradient solar pond. Depending on the pure water production capacity desired, one or more evaporator modules may be placed along the full length of the pond. The evaporator module of the present invention is a form of cylindrical, horizontal tube falling film evaporator in which the tubes, on both ends, allow direct entry and passage therethrough of a salt solution heating medium. The raw feedwater enters the evaporator module through a supporting center shaft, falls through perforations and then from tube to tube, being repeatedly exposed to the heat from heating medium within the tubes.

The entire evaporator module rotates about its horizontal axis at a rate slow enough so as not to disturb the salt gradient but rapidly enough to ensure contact of the falling droplets with many of the tubes within the module. The rotation of the module also serves the purpose of agitating the increasingly concentrated liquid at the bottom of the evaporator module body to improve heat transfer and forming thin films of this liquid as the tubes emerge in their rotation. Flowthrough of the heating medium is induced through the rotation of the apparatus acting in connection with strategically oriented cavitation fins.

The vapor generated by the evaporation process exits at the opposite end of the center shaft and rises through an exit pipe and is directed to a condenser. Thus, the present invention has the effect of converting solar energy into pumping energy. Depending on the location of the point of use and the available head of the feedwater source, this invention may eliminate the need in the process for pumps constructed of costly metal alloys. In contrast, in conventional arrangements, wherein the evaporator is external to the solar pond, it is necessary to pump the saturated salt solution to the evaporator.

Periodically the evaporator must be flushed to remove concentrate. This may be accomplished by directing a large flow of raw feedwater through the evaporator module. The resultant mixture of raw feedwater and concentrate exit the module either up through the exit pipe or down through a drain, if provided. The evaporator module may be brought to the surface of the pond for inspection and maintenance by effecting changes in the buoyancy of the evaporator body in a manner similar to the way submarines remove or add ballast to rise or fall.

Instead of vaporizing raw feedwater, the high rate solar still of the present invention may be used, without significant modification, to vaporize low boiling point heat transfer fluids to be used in connection with a Rankine cycle turbine generator system to produce electrical power. In this case there would be no residue to be removed from the apparatus.

A second preferred embodiment of the present invention, hereinafter referred to as a waste heat evaporator, suspends the evaporator module in a vessel or enclosure through which a liquid heating medium flows, i.e. hot industrial effluent, boiler blowdown or contaminated steam condensate. In this embodiment the module may be rotated at a higher speed. The resulting turbulence will improve heat transfer efficiency due to the dispersal of the thermal layer on both sides of the heat transfer surface. Other benefits are greater velocity of the heating medium being drawn through the tubes and reduced fouling and scaling. Since the vessel or channel may be drained, inspection, cleaning and repair of the apparatus can be accomplished without its removal. The application of the waste heat evaporator embodiment of the present invention may be utilized in the recovery of waste heat from highly contaminated hot industrial effluents in order to produce purified water, space heat, vapor for process use or even electrical power in connection with the use of low boiling point heat transfer fluids. Conventional shell and tube heat exchanger/evaporators are difficult to use in such applications due to increased potential for plugging and fouling.

In essence this embodiment of the present invention facilitates a two stage heat exchange process. The heat is transferred from the hot dirty effluent to the raw feedwater (or heat transfer fluid) which in the form of vapor escapes the module thus preventing the possibility of cross contamination from leaks through either the heat transfer tubing or seal system. When condensed, the vapor rejects its heat in the desired location, for example, for space heating or for preheating boiler feedwater while at the same time producing pure water. Alternately the vapor may be upgraded to higher quality steam for process use by mechanical vapor compression, or in the case of low boiling point heat transfer fluids, used to generate electrical power.

A third preferred embodiment of the present invention utilizes the evaporator module, with certain modification, as a biological/chemical reactor. In this embodiment the module may be supported by attaching the external piping to each tube sheet at the centerline and the internal perforated portion of the center shaft may be removed. This combination heat exchanger/reactor, as before, may be submerged and rotated within a heating (or cooling) medium. Many biological processes benefit from the addition of moderate amounts of heat thereby raising the temperature of the liquor to a level that optimizes the rate of metabolism of the organisms involved. Many endothermic chemical reactions also require the addition of heat. Exothermic reactions, either biological or chemical, generally must be sustained by continuous cooling. The reactor embodiment as described herein promotes rapid heat transfer to or from the reaction, careful temperature control, and affords the capability of heat recovery for economical operation. The movement of the heat transfer tubes through the reaction liquor contained in the partially filled module imparts gentle mixing and agitation while at the same time provides a thin film interface to facilitate the separation of gaseous reaction products. Such gaseous reaction products, if not promptly removed, may inhibit the reaction. The transfer of heat directly to the center of the reactor reduces the energy required for proper dispersal of heat. The module's submergence within the heating or cooling medium reduces the risk of airborne contamination of the reaction by undesirable organisms or gases. Contamination by seal in-leakage may be prevented by circulating the heating or cooling medium through conventional treatment devices such as ultraviolet light sterilizers and/or filters.

A fourth preferred embodiment of the present invention utilizes the evaporator module, modified similarly to the biological/chemical reactor version, to serve as a gas-liquid contactor. The module is submerged and rotated, as before, within a heating medium. In this instance, a gas, usually air, is introduced at one end and flows through the hollow shaft and module counter current to a liquid introduced at the other end. The separation of gas or VOC's from the liquid takes place at the outer surface of the horizontal heat transfer tubes and at the surface of the cylindrical shell within the module. Heat is transferred precisely and directly to the point where it most effectively enhances the stripping process. Thus as the tubes emerge from beneath the liquid level within the module, they perform simultaneously several beneficial process functions; namely, (1) they form uniform thin films which minimizes the diffusional path of the contaminants in the liquid and effectively exposes the liquid to the gas; and (2) they rapidly heat the liquid phase which raises the Henry's Law constant, increases the water diffusion coefficient and creates turbulence in both the liquid and gas phases that improves both heat and mass transfer.

The contaminants transferred to the gas phase may be drawn from the module by an exhaust blower. The heat induced improvement in contaminant removal rate will significantly reduce the volume of gas needed for the stripping process. In the case of air stripping of VOC's the highly enriched air-VOC mixture can be more economically processed in an incinerator or catalytic oxidation device, than can the very dilute mixtures typically produced by packed tower air strippers. The incinerator or catalytic oxidation device, in turn, can be the source of heating medium, usually hot water, for the present invention.

DESCRIPTION OF PREFERRED EMBODIMENTS

Figure 1:
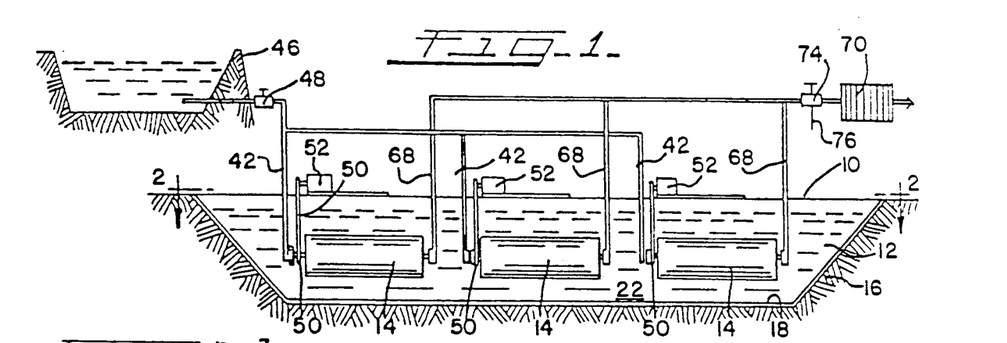
FIG. 1 is an elevational view, partially in section, of a preferred embodiment of the invention, schematically depicting the raw water impoundment and the condenser.
Figure 2:
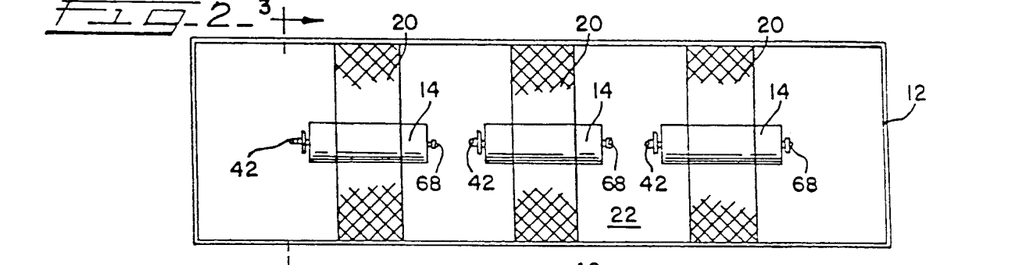
FIG. 2 is a top plan view taken along line 2—2 in FIG. 1.
Figure 3:
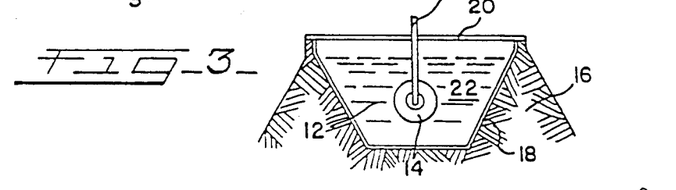
FIG. 3 is an elevational sectional view taken along line 3—3 in FIG. 2.

Referring to FIGS. 1-3, a first preferred embodiment of a high rate solar still system in accordance with the present invention is indicated by the reference numeral 10. Solar still system 10 comprises a salt gradient solar pond 12, having a plurality of evaporator modules 14 submerged therein. The solar pond is preferably of a long and narrow configuration to reduce the unsupported span and the construction cost of the bridge structure which supports the evaporator modules. The pond is preferably formed on the bottom by soil and on its sides by earthen dikes 16 and is overlayed with a suitable factory fabricated impermeable pond liner 18. Solar pond 12 is preferably dimensioned as follows: 8 feet to 20 feet in width; 4 feet to 12 feet in depth and may be of unlimited length.

The evaporator modules 14 are supported from support bridges 20, of suitable construction, which span the width of the solar pond 12, such that the evaporator modules are submerged in the heat storage section 22 of the solar pond 12 and oriented parallel to the length thereof. Depending on the pure water production capacity of the system, evaporator modules may be positioned along the full length of solar pond 12. Further, two or more transversely spaced modules may be supported from each bridge structure 20. Alternatively, the evaporator modules may be oriented perpendicular to the length of solar pond 12.

Figure 4:
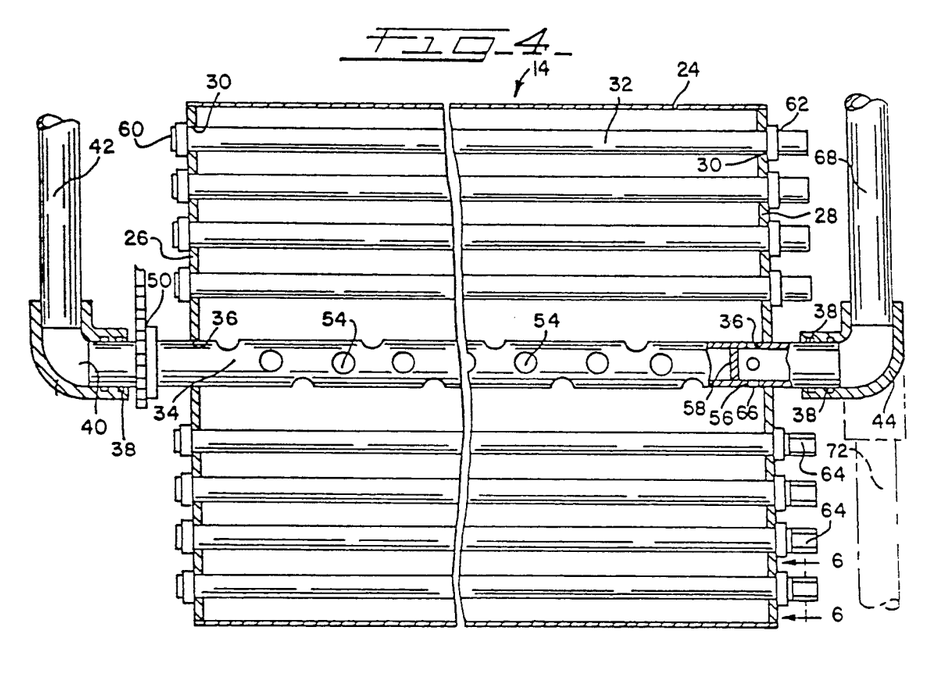
FIG. 4 is a sectional elevational view of an evaporator module constructed in accordance with the present invention.
Figure 5:
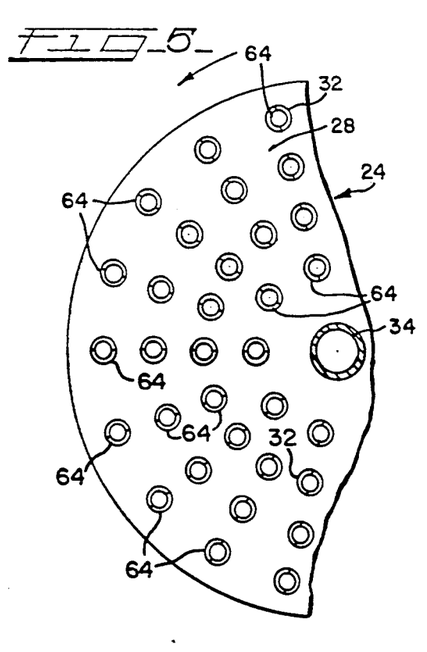
FIG. 5 is an end view at the effluent end of a portion of the evaporator module as shown in FIG. 4.

Referring to FIGS. 4 and 5, an evaporator module 14, constructed in accordance with the present invention, is depicted comprising an elongated cylindrical housing 24, sealed off by an influent end plate 26 and an effluent end plate 28. End plates 26 and 28 have a plurality of aligned openings 30 formed therein for receipt of open ended heat transfer tubes 32 therethrough. The respective end portions of heat transfer tubes 32 are suitably sealed to the end plates 26 and 28. A horizontally disposed hollow support shaft 34 extends through horizontally aligned openings 36 in plates 26 and 28 along the horizontal axis of housing 24. Shaft 34 is rigidly secured and sealed to plates 26 and 28 such that rotation thereof effects rotation of the evaporator module 14. The respective ends of shaft 34 are supported for rotation in a suitable manner as by a Teflon bearing and lip seal arrangement 38. The influent end 40 of shaft 34 is connected to a raw feedwater conduit 42 through a suitable fitting 44. Conduit 42 is in communication with a reservoir or source of raw feedwater indicated by the reference numeral 46 in FIG. 1. A control valve 48 is provided to control the flow of raw feedwater through conduit 42.

The entire evaporator module 14 rotates about its horizontal axis and is suitably driven in a conventional manner. For example, a chain and sprocket arrangement 50 secured to shaft 34 may be utilized in cooperation with a motor 52 supported on bridge 20. Alternatively, a hydraulic turbine (not shown) may be utilized to rotate shaft 34 and thereby rotate module 14.

Referring to FIG. 4, shaft 34 is provided with a plurality of openings 54 spaced along substantially the entire length within housing 24. The effluent end portion 56 of shaft 34 is closed off by a wall 58, positioned a short distance inward of end plate 28. Accordingly, all of the raw feedwater directed into shaft 34 through conduit 42 falls through openings 54 into the housing 24. The openings 54 are preferably sized and located in such a manner as to cause the raw feedwater to be distributed along the full length of shaft 34 in approximately uniform flow as the evaporator module 14 rotates about its horizontal axis.

Figure 6:
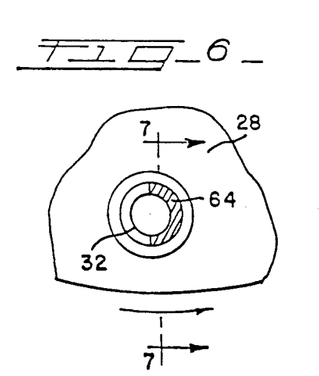
FIG. 6 is a sectional view of the heat transfer tube and cavitation fin, taken along line 6—6 in FIG. 4.
Figure 7:
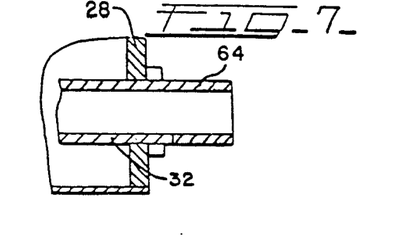
FIG. 7 is a sectional view taken along line 7—7 in FIG. 6.

Referring to FIGS. 4-7, heat transfer tubes 32 have influent end sections 60 and effluent end sections 62, which respectively extend outwardly of plates 26 and 28. In order to gently induce the passage of the salt solution medium from solar pond 12 into the influent end portions of tubes 32, the effluent end portions of tubes 32 are provided with cavitation fins 64. Cavitation fins 64 are preferably formed by excising a partial section from the effluent end sections 62, as shown in FIGS. 6 and 7, or, alternatively, by securing a flexible tube sleeve of the same shape. Each cavitation fin 64 is preferably oriented such that an imaginary radial line passing through the apex thereof is always tangent to an imaginary circle that defines the direction of rotation of the corresponding heat transfer tube 32.

The evaporator module 14 is rotated at a rate slow enough so as not to disturb the salt gradient but rapidly enough to ensure contact of the falling droplets passing through openings 54 with many of the tubes 32 within the evaporator module. The rotation also serves the purpose of agitating the increasingly concentrated liquid at the bottom of the evaporator housing 24 and forming thin films of this liquid as the tubes emerge in their rotation. This periodic submergence of some of the tubes also has the effect of reducing fouling and scaling. The optimum level of liquid in housing 24 is suitably controlled to maximize the evaporation process.

The vapor generated during the evaporation process exits the evaporator module 14 through openings 66 in the effluent end portion 56 of shaft 34 downstream from wall 58. The vapor rises up a vertical effluent conduit 68, secured to shaft 34 by a bearing and lip seal arrangement 38 and a fitting 44, and is directed to a heat exchanger/condenser 70, which condenses the vapor into pure product water in a conventional manner. This heat exchanger/condenser 70 may be either air cooled or water cooled. The condensed product water is then directed to its intended use or into a storage tank. The overall efficiency of the process may be improved by using the vapor to heat the incoming raw feedwater.

The evaporator module 14 is preferably constructed of corrosion resistant materials. The module is preferably assembled with gaskets, grommets and fasteners in such a way that it can be disassembled in the field by unskilled labor for the repair and replacement of components and for the removal of scale and foulants.

Periodic flushing of the evaporator module 14 to remove concentrate and to minimize scaling may be accomplished by allowing a large flow of feedwater to enter the evaporator module either from a higher elevation raw water storage impoundment or by pumping. The resultant mixture of raw water and concentrate exits through the openings 66 and is directed up the vertical exit effluent conduit 68, or alternately down a drain conduit 72, as shown in phantom lines in FIG. 4. The flushing operation is controlled by valve 48 and an effluent valve 74 to direct the concentrate to a disposal conduit 76, to prevent the flooding of the heat exchanger/condenser 70 and to prevent untimely drainage. The flushing function may also be accomplished by using the evaporator module in the manner of a compressed air ejector in order to reduce the quantity of wastewater.

Figure 8:
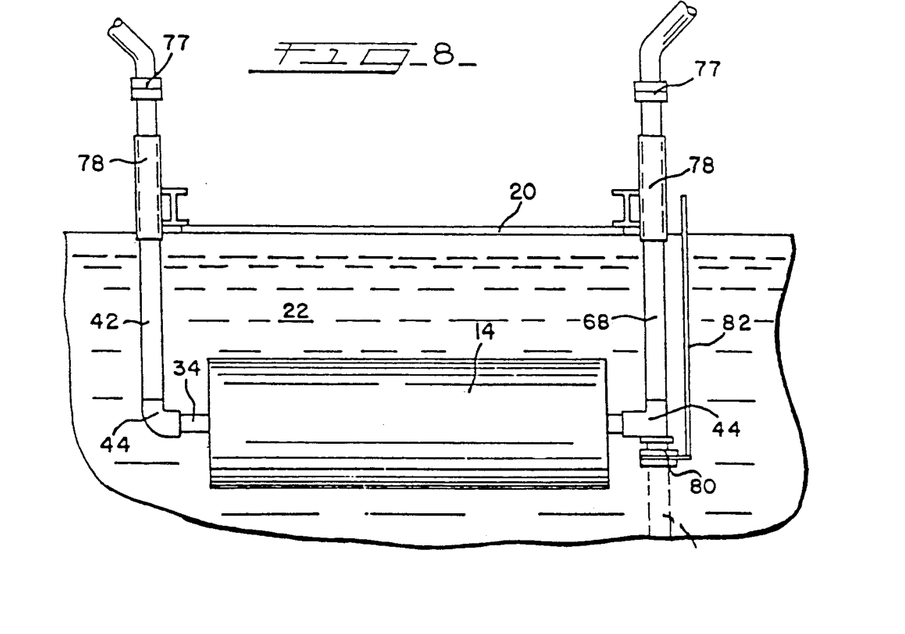
FIG. 8 is an elevational view of a preferred arrangement for raising and lowering the evaporator module.

Referring to FIG. 8, in accordance with a preferred embodiment of the invention, the evaporator module 14 and interconnected piping may be raised to the surface of the solar pond 12 for inspection and subsequent removal if necessary. First the feedwater valve 48 is closed and continued evaporation will increase the buoyancy of the module. Second, the upper ends of conduits 42 and 68 are released at quick disconnect fittings 77. The submerged module 14 and conduits 42 and 68 are allowed to rise, guided by pipe sleeves 78 secured to the bridge 20. To return the apparatus to its submerged operating position, water is inserted through the open feedwater piping to fill the evaporator body to the extent that it will sink in manner similar to adding ballast to a ship or submarine. When a drain 72 is provided, disconnection is achieved with a quick disconnect coupling 80 and an extended operator rod 82. In this case the small amount of heating medium filling the open drain pipe can be drained into a container and returned to the pond. Alternatively, to facilitate removal of the evaporator from the pond surface the bridge may be raised by virtue of a pin and hinge arrangement (not shown) on one side of the bridge 20.

Figure 9:
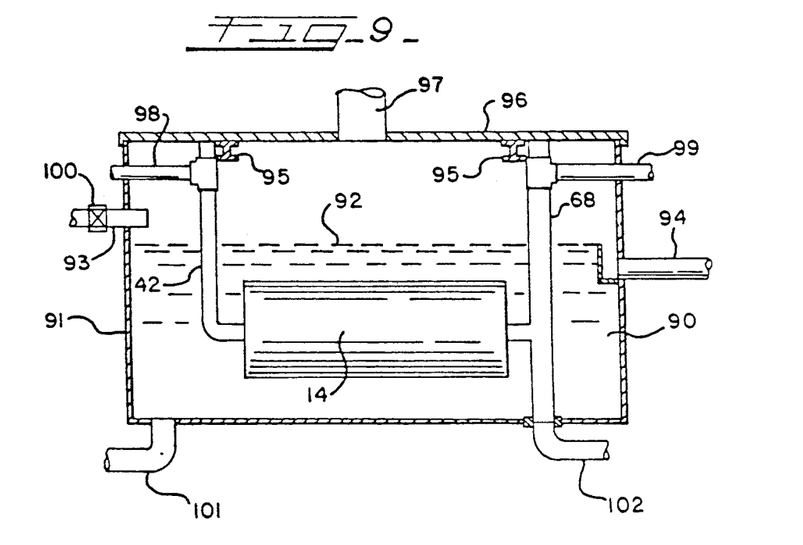
FIG. 9 is an elevational view, partially in section, of a second embodiment of the invention.

The evaporator module 14 as described herein may be submerged with a similar effect in any body of heated liquid. Referring to FIG. 9, in accordance with a preferred embodiment of the invention, a waste heat evaporator system is indicated generally by reference numeral 90. The waste heat evaporator system 90 comprises an enclosure or tank 91 having one or more evaporator modules 14 submerged therein. The tank 91 contains a heating liquid or medium 92, for example an available hot industrial effluent, that enters through conduit 93 and exits through conduit 94 at a rate such that a suitable depth is maintained in the tank 91. The evaporator module is supported by a bridge 95 similar to the previously described solar still embodiment 10. The tank may support a removable cover 96 to prevent the escape of vapor from the heating medium into a working area. The cover may be equipped with a duct 97 to recover vapor that flashes from the heating medium. The operation of the waste heat evaporator system 90 is identical to the previously described solar still embodiment 10 where raw feedwater enters through conduit 42 and vapor exits through conduit 68 except that it is no longer necessary to limit the speed of rotation to avoid excessive turbulence in the tank 91, and the module may be more conveniently serviced in place. Further, in addition to the previously stated conventional means to effect rotation, it is possible to drive the rotation of the module 14 by using the head energy of the heating medium entering the tank through conduit 93 against a turbine or water wheel (not shown) affixed to the evaporator module 14. Means is provided to drain the tank to allow inspection, cleaning and repair of the module 14 in place. This consists of a valve 100 on the influent conduit 93 and a drain 101 in the bottom of the tank 91. Because it is not necessary to regularly remove the module 14 from the tank 91, a horizontal extension 98 of feedwater influent conduit 42 and a horizontal extension 99 of conduit 68 may be provided. Concentrate may be flushed from the module 14 in the same manner as previously described for the solar still embodiment 10 with the concentrate exiting the system through conduits 68 and 99 or concentrate drain 102. Alternately the evaporator module 14 may be submerged within a conventional channel (not shown) containing flowing heating medium wherein a downstream flow control device such as a flume or weir, maintains a suitable operating depth.

In either preferred embodiment of the present invention, the high rate solar still depicted in FIGS. 1, 2 and 3 or the waste heat evaporator depicted in FIG. 9, low boiling point heat transfer fluids may be substituted for the raw feedwater to the effect that the resulting vapor may be used to generate electrical power in combination with a Rankine cycle turbine generator system.

Figure 10:
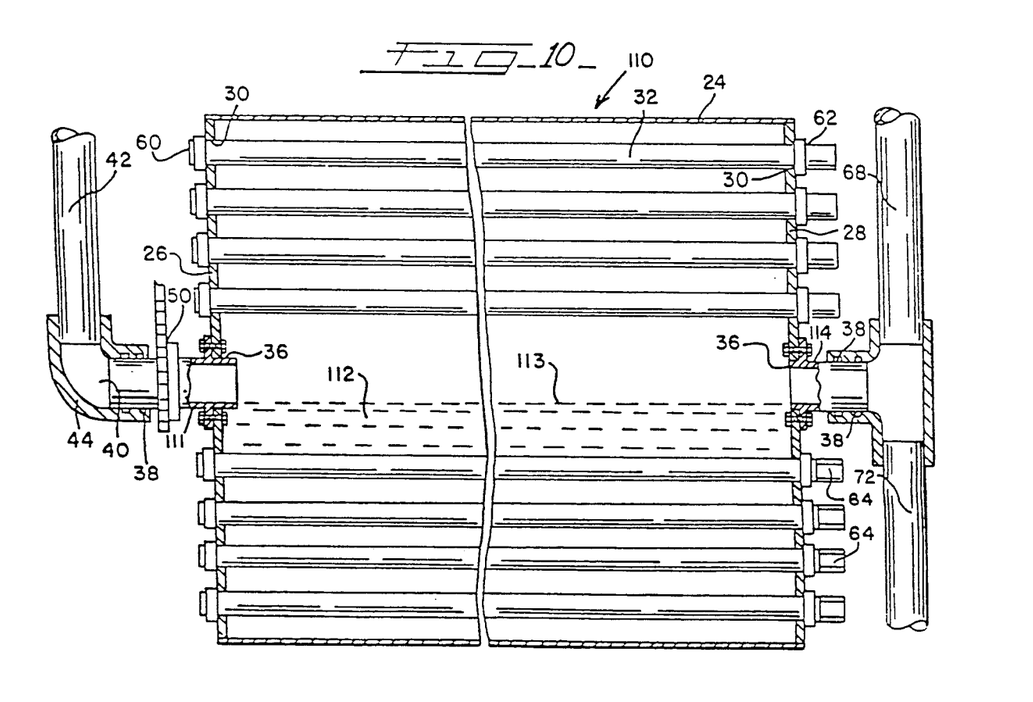
FIG. 10 is a sectional elevational view of a third embodiment of the invention showing a biological/chemical reactor module.

In accordance with a further preferred embodiment of the invention, the evaporator module 14 as described herein may be modified by removing a portion of the hollow support shaft 34, so that the module may be utilized as a biological/chemical reactor submerged within a temperature controlled liquid body. Referring to FIG. 10, a preferred embodiment of a biological/chemical reactor in accordance with the present invention is indicated by reference numeral 110. The reactor 110 is submerged within a containment vessel or enclosure (not shown) with connections and supports similar to the waste heat evaporator embodiment 90 and to the solar still embodiment 10. Chemical reactants or nutrient laden substrates enter the reactor through conduit 42 and through the truncated influent end of the hollow support shaft 111. The desired reaction takes place within a liquor filled reservoir 112 within the reactor 110 while said reactor rotates as described in the previous embodiments. The maximum liquid level 113 may be automatically maintained. As fluid enters the reactor through the truncated influent hollow support shaft 111 an equal quantity of fluids, comprised of reaction products and suspended solids, will exit through the effluent hollow support shaft 114 which is affixed to plate 28, and down the drain conduit 72 for further processing. The rotation of the reactor 110 causes each heat transfer tube 32 to periodically enter and exit the liquid reservoir 112 within the reactor 110. The interaction of the tubes 32 and reservoir 112 results in a beneficial agitation and mixing of liquor within the reservoir. As the tubes 32 emerge from the reservoir, thin films of liquor form on the tubes that facilitate the separation of gaseous reaction products from the liquor. These gaseous products and vapors exit the reactor module 110 through the effluent hollow support shaft 114 and through vertical exit conduit 68. The reactor 110 is preferably submerged within an uncontaminated, carefully controlled heating or cooling medium or within the effluent of the reaction process itself which may be recirculated, with makeup heat, through the containment vessel for the purpose of heat recovery. Heat transfer takes place continuously through the reactor shell 24 and the heat transfer tubes 32.

The reactor 110 may be operated in batch or continuous mode. Solids and residues are removed as described in the previous embodiments. As described the reactor module and connecting piping may be strengthened in such a way as to allow its use as a compressed air ejector during the flushing cycle to avoid dilution of the solid residues and to ensure their removal.

One example use for reactor 110 is in the scale up of laboratory fermenters constructed of glass. Glass fermenters have well known advantages including inertness to reactants and observability, but usually give way to polished stainless steel construction in pilot and commercial scale applications. Large glass fermenters would have to be excessively heavy or else be subject to breakage from internal pressure buildup or from external blows, thus allowing escape of possible dangerous reactants. In contrast the reactor embodiment of the present invention, constructed of borosilicate glass, with the possible exception of stainless steel tube sheets, would overcome these limitations to scaleup. Its submergence in a water heating or cooling medium filled tank would obviate the problem of excess weight due to its buoyancy, protect the reactor wall from external blows, and counteract somewhat internal pressure buildup. In-situ sterilization of the contents of the reactor can be easily and quickly achieved by elevating the temperature of the heat medium in which the reactor is submerged.

Another example use of the reactor 110 is in connection with the anaerobic treatment of wastewater. The principal gaseous products of this biological reaction are carbon dioxide and methane. Typical operating problems of conventional technology are difficulty in maintaining temperatures optimal for both the acid and methane forming bacteria, excessive turbulence from high energy mixers that cause foaming and shearing of biological floc, entrapment of gas bubbles in the solids, and the buildup of acids and dissolved carbon dioxide that lowers the PH and inhibits the methane forming bacteria. The reactor 110, with its internal tube array, would ensure the rapid transfer of heat to the reactor center while at the same time imparting a gentle non-foaming mixing action and promote the formation of thin films of liquid that facilitate the separation and release of both the methane and carbon dioxide. The reactor affords the ability, within a single tank system, to rapidly raise and lower the temperature to favor either the acid forming or methane forming bacteria within, for example to limit the buildup of acids that are inhibiting the methane formers.

Figure 11:
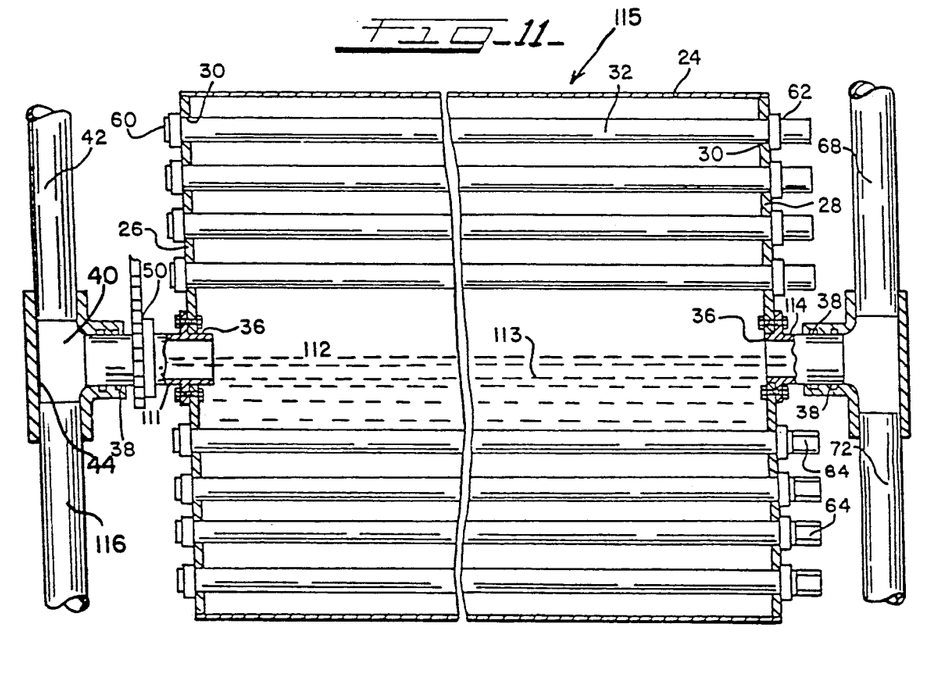
FIG. 11 is a sectional elevational view of a fourth embodiment of the invention showing a gas-liquid contactor module.

In accordance with the fourth preferred embodiment of the present invention, the evaporator module, modified similarly to the biological/chemical reactor embodiment described in FIG. 10, may be further modified by adding an additional inlet pipe and utilized as a gas/liquid contactor submerged within a flowing heating medium. Referring to FIG. 11, a preferred embodiment of a gas-liquid contactor in accordance with the present invention is indicated by reference numeral 115. The contactor is submerged within a containment vessel or enclosure (not shown) with connections and supports similar to the waste heat embodiment 90 and to the solar still embodiment 10, except that a new inlet conduit 116 is added. A liquid containing dissolved gases or volatile organic contaminants (VOC) enters the contactor through conduit 116 and through the truncated influent end of the hollow support shaft 111. The stripping gas, such as clean air, enters the contactor through conduit 68 and through the truncated hollow support shaft 114. The contact between gas and liquid takes place on the surface of the heat transfer tubes 32 situated above the maximum liquid level 113 while the contactor rotates as described in the previous embodiments. The maximum liquid level may be automatically maintained.

As fluid enters the contactor through the truncated influent support shaft 111 an equal quantity of the fluid, substantially stripped of dissolved gases, will exit through the effluent hollow support shaft 114 which is affixed to plate 28, and down the drain conduit 72. The maximum level 113 is maintained at a level so as to allow space for the withdrawal of gaseous stripping medium without excessive pressure losses. The rotation of the contactor causes each heat transfer tube 32 to periodically enter and exit the liquid reservoir 112 within the contactor 115. As the tubes emerge from the reservoir, thin films of liquid form on the tubes that facilitates the separation of dissolved gases and VOC's from the liquid. These vapors exit the contactor through the influent support shaft 111 and through conduit 42 for further processing. The contactor is submerged within the heating medium. Heat transfer takes place continuously through the contactor shell 24 and the heat transfer tubes 32. The contactor is operated in a continuous mode. In general there will be no buildup of solids or residues within the contactor 115.

One example use of the gas-liquid contactor 115 is the stripping with clean air of groundwater contaminated with VOC's. Conventional packed towers exhibit problems with proper liquid distribution and adequate wetting of media. The stripping process is inhibited by the low temperature of the groundwater and in winter by the cold stripping air temperature. Tall packed towers require substantial pumping head and produce a very dilute gaseous effluent which is expensive to treat in a catalytic oxidation furnace. In contrast the gas-liquid contactor embodiment of the present invention is a horizontal, low pumping head process, with assured wetting of the contacting surfaces. The addition of heat significantly improves the efficiency of the VOC removal process and produces a highly enriched gaseous effluent that requires much less fuel to destroy in a furnace.

Another example of the use of the gas-liquid contactor 115 would be the stripping of carbon dioxide in a water treatment process. Oxygen could also be stripped from water using an inert gaseous stripping medium such as nitrogen gas.

What is claimed is:

1. A biological/chemical reactor apparatus comprising:
   (a) a reactor module supported within an enclosure defining a storage section containing a first temperature controlled liquid, for rotation about a substantially horizontal axis and submerged within said liquid storage section, comprising:
      (i) an elongated cylindrical housing sealed off by an influent end plate and an effluent end plate,
      (ii) a plurality of spaced apart substantially horizontal open ended heat transfer tubes positioned within said housing having influent and effluent end sections thereof respectively extending through said influent end plate and said effluent end plate for passage of said first liquid from said enclosure therethrough;
   (b) an influent conduit means for directing a second reactant liquor into said housing and maintaining said second liquor at a predetermined level;
   (c) means for rotation of said reactor module about a substantially horizontal axis so as to cause said heat transfer tubes to periodically enter and exit said second liquor so as to cause thin films of said second liquor to form on said heat transfer tubes and separate gaseous reaction products therefrom;
   (d) means for withdrawing the separated gaseous reaction products from said reactor module; and
   (e) means for withdrawing reaction products and suspended solids from said reactor module.

2. The invention as defined in claim 1 wherein said effluent end section of said heat transfer tubes have cavitation fin means associated therewith which extend into said liquid storage section for inducing the flow of said first liquid from said liquid storage section into said influent end sections of said heat transfer tubes.

3. The invention as defined in claim 2 wherein said cavitation fin means are formed by excising a partial section of the effluent end sections of said heat transfer tubes.

4. The invention as defined in claim 2 wherein said heat transfer tubes are defined by cylindrical walls and said cavitation fin means are formed as segments of said cylindrical wall.

5. The invention as defined in claim 4 wherein said cavitation fin means are oriented such that an imaginary radial line passing through the apex thereof is always substantially tangent to an imaginary circle that defines the direction of rotation of the corresponding heat transfer tube.

6. The invention as defined in claim 1 wherein said means for withdrawing separated gaseous reaction products from said reactor module includes an effluent conduit in communication with said housing at an elevation above the level of said second liquor.

7. The invention as defined in claim 1 wherein said means for withdrawing reaction products and suspended solids from said reactor module includes an effluent conduit in communication with said housing at an elevation below the level of said second liquor.

8. A gas-liquid contractor apparatus, comprising:
   (a) an enclosure defining a heat storage section containing a first hot liquid;
   (b) a gas-liquid contactor module suuported within said enclosure for rotation about a substantially horizontal axis and submerged within said heat storage section thereof, comprising;
      (i) an elongated cylindrical housing sealed off by spaced apart end plate;
      (ii) a plurality of spaced apart substantially horizontal open ended heat transfer tubes positioned within said housing influent and effluent end sections thereof extending through said end plates for passage of said first hot liquid from enclosure therethrough;
   (c) a first influent conduit for directing a second liquid containing dissolved gases or volatile organic contaminants into said housing and maintaining said second liquid at a predetermined level;
   (d) a second influent conduit for directing a stripping gas into said housing;
   (e) means for rotation of said contactor module about a substantially horizontal axis so as to cause said heat transfer tubes to periodically enter and exit said second liquid containing dissolved gases or volatile organic contaminants to form thin films of said second liquid on the outer surfaces of said tubes;

(f) means for withdrawing said second liquid stripped of dissolved gases or volatile contaminants from said contactor module; and (g) means for withdrawing separated gases from said contractor module.

9. The invention as defined in claim 8 wherein said effluent end section of said heat transfer tubes have cavitation fin means that extend into said heat storage section for inducing the flow of first liquid from said liquid storage section into said influent end sections of said heat transfer tubes.

10. The invention as defined in claim 9 wherein said cavitation fin means are formed by excising a partial section of the effluent end sections of said heat transfer tubes.

11. The invention as defined in claim 9, wherein said heat transfer tubes are defined by cylindrical walls and said cavitation fin means are formed as segments of said cylindrical wall.

12. The invention as defined in claim 11 wherein said cavitation fin means are oriented such that an imaginary radial line passing through the apex thereof is always substantially tangent to an imaginary circle that defines the direction of rotation of the corresponding heat transfer tube.

13. The invention as defined in claim 8 wherein said means for withdrawing said second liquid stripped of dissolved gases or volatile organic contaminants includes an effluent conduit in communication with said housing at an elevation at the predetermined level.

14. The invention as defined in claim 8 wherein said means for withdrawing separated gases from said contactor module includes an effluent conduit in communication with said housing at an elevation above the predetermined level.

* * * * *